(12) United States Patent
Lawhorn

(10) Patent No.: US 7,818,216 B2
(45) Date of Patent: Oct. 19, 2010

(54) TRANSACTION SYSTEM WITH CENTRALIZED DATA STORAGE AND AUTHENTICATION

(76) Inventor: Seraphim Lawhorn, 1226 Crestbrook La., Knoxville, TN (US) 37923

( * ) Notice: Subject to any disclaimer, the term of this patent is extended or adjusted under 35 U.S.C. 154(b) by 1087 days.

(21) Appl. No.: 11/467,732

(22) Filed: Aug. 28, 2006

(65) Prior Publication Data

US 2008/0052180 A1 Feb. 28, 2008

(51) Int. Cl.
*G06Q 30/00* (2006.01)
(52) U.S. Cl. .......................... 705/26; 705/27
(58) Field of Classification Search .................. 705/26, 705/27
See application file for complete search history.

(56) References Cited

U.S. PATENT DOCUMENTS

| | | | | |
|---|---|---|---|---|
| 6,535,857 | B1 * | 3/2003 | Clarke et al. .................. | 705/28 |
| 7,418,426 | B1 * | 8/2008 | Reunert et al. ................ | 705/40 |
| 2002/0072990 | A1 * | 6/2002 | Loeb et al. .................... | 705/26 |
| 2002/0111908 | A1 * | 8/2002 | Milberger et al. ............. | 705/44 |
| 2003/0208442 | A1 * | 11/2003 | Cockrill et al. ............... | 705/40 |
| 2004/0024688 | A1 * | 2/2004 | Bi et al. ........................ | 705/37 |
| 2004/0044622 | A1 * | 3/2004 | Blott et al. .................... | 705/40 |
| 2004/0078341 | A1 * | 4/2004 | Steichen ....................... | 705/64 |
| 2005/0165656 | A1 * | 7/2005 | Frederick et al. ............. | 705/26 |
| 2006/0265329 | A1 * | 11/2006 | Hug .............................. | 705/50 |
| 2007/0299681 | A1 * | 12/2007 | Plastina et al. ................ | 705/1 |
| 2008/0015945 | A1 * | 1/2008 | Goldstein ..................... | 705/26 |
| 2008/0015983 | A1 * | 1/2008 | Spikes .......................... | 705/40 |

OTHER PUBLICATIONS

Dan Gisolfi; "The Web Services Architect: Catalysts for Fee-Based Web Services"; http//:www-106.ibm.com/developerworks/library/ws-arc6/ (1of7) Nov. 19, 2001.*

* cited by examiner

*Primary Examiner*—Jason Dunham
(74) *Attorney, Agent, or Firm*—Knox Patents; Thomas A. Kulaga (57) ABSTRACT

A centralized transaction system including a server communicating with client workstations and remote devices. The system includes a server communicating with a terminal, a remote device, and a workstation. Both customers and vendors access the server through a workstation to set up and maintain information on the server and to access historical information relating to transactions. The system is suitable for both on-line transactions and brick-and-mortar store transactions, including convenience transactions. A customer possesses an identification code that is presented to a vendor for a transaction. The vendor sends the identification code to a server, which sends an authentication code to a remote device in possession of the customer. The customer causes the authentication code to be sent to the server, which authenticates the customer for the transaction. The server applies deals previously saved by the customer and the transaction is completed with the server providing previously saved payment information.

7 Claims, 10 Drawing Sheets

TRANSACTION SYSTEM WITH CENTRALIZED DATA STORAGE AND AUTHENTICATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a centralized transaction system. More particularly, this invention pertains to a system in which customer information is acquired and stored before a transaction is initiated and that information is used to complete the transaction. Before the transaction is completed, the customer is authenticated by the system. The customer information includes customer identification information, customer payment information, and customer selected deals, including coupons, discounts, and rebates.

2. Description of the Related Art

From time immemorial, individuals have completed transactions with others. In days gone by, such transactions consisted of trading one item for another. Today, transactions are much more complex. Many people have a multitude of credit and debit cards, in addition to cash and checks, that are used to pay for goods and/or services obtained through face-to-face transactions, as well as transactions conducted over the telephone, the mail, and the Internet.

The multitude of credit and debit cards creates problems for many people. One such problem is that there are often too many cards to carry around and keep track. Not to mention the effort required to maintain each account and to reconcile each account. Each additional card adds to the security efforts necessary to ensure that the card is not stolen or the account is not being used improperly or without authorization. Some credit card vendors even issue temporary card numbers for security purposes to make it more difficult for others to use the credit card without authorization.

On-line transactions also create problems for many people. Secure web sites require a user identification name and a password. For good security, it is recommended that users have a different password for each site and that the password be strong, that is, the password contains numbers and letters, both upper and lower case. To further complicate matters, it is recommended that passwords never be written down, making it difficult for people to remember their many passwords.

In today's competitive market, vendors often offer deals, such as discounts, coupons, and rebates, to entice customers to shop with the vendor. These deals are often available for both traditional brick-and-mortar stores and on-line stores. Value conscious consumers spend time searching, acquiring, and storing coupons and then remembering to use those coupons when shopping.

It is not only customers that experience problems with the current variety of transactions, but vendors experience problems. One such problem is the mining, collection, and analysis of customer and transaction data acquired from the various types of transactions. Vendors use such data to better market their products and services to those that are most likely to purchase them.

Because vendors accept a multitude of credit/debit cards, there is a large administrative burden of tracking, maintaining, and reconciling the transaction information from a multitude of financial institutions. Additionally, in order to obtain a financial overview, information from the multitude of financial institutions must be combined, which is often difficult because of the different reporting methods used by the institutions.

Additionally, security of confidential and personal information obtained by vendors is a concern, both for the vendor and the customer. There is a need to maintain confidentiality of customer's personal financial information. Credit and debit card data must be protected against unauthorized access to prevent others from making unauthorized purchases. At brick-and-mortar stores, the physical credit/debit card is handled and paper records are often kept with credit/debit card information. For on-line vendors, there is no established standard for processing financial information obtained from customers.

Credit card companies and other financial institutions experience problems with unauthorized transactions. Oftentimes the vendor who supplies goods or services in an unauthorized transaction does not receive payment from the credit card company or financial institution. In other cases, the credit card company or financial institution absorbs the cost of unauthorized transactions, such as when a credit card is stolen.

BRIEF SUMMARY OF THE INVENTION

According to one embodiment of the present invention, a centralized transaction system is provided. A server acquires and stores customer and vendor information before a transaction is initiated, and the server information is used to complete the transaction. The customer information includes customer identification information, customer preference data, customer payment information, including a preferred payment method, and customer selected deals, including coupons, discounts, and rebates. The vendor information includes vendor identification information and vendor preference data.

The transaction system is suitable for transactions completed on-line such as over the Internet, at brick-and-mortar stores, and at convenience locations, such as gas stations. Both customers and vendors subscribe to the transaction system. The centralized transaction system includes a server communicating with client workstations and remote devices. The client workstations include a terminal accessed by brick-and-mortar and convenience vendors and personal computers accessed by customers and vendors.

A vendor provides information on deals to the server. A customer locates and selects the deals from vendors before purchasing goods and/or services from the vendor. During the transaction, the deals are applied. Any rebates or post-transaction deals are processed after the transaction. As part of the purchase process, the customer provides an identification code to the vendor; an authentication code is immediately sent to the customer; the authentication code is provided to the vendor to forward to the server, which authenticates the customer; and the transaction is permitted to be completed. The customer has the option of using stored payment information to complete the transaction or to tender payment locally, such as by offering cash or a credit/debit card. Additionally, the customer has the option of specifying vendors or purchase amounts, such as for convenience purchases, where the authentication process is not required in order to complete the transaction.

An identification device contains the customer's identification code. In one embodiment, the identification device is a wallet-sized card. A remote device receives the authentication code sent by the server, with the code being communicated back to the server through a terminal workstation. In one embodiment, the remote device is a mobile telephone with text messaging or e-mail capabilities. The mobile telephone receives the authentication code from the server. In one embodiment, the customer has a preselected customer code that appears in conjunction with the authentication code from the server, thereby allowing the customer to verify that the authentication code is authentic.

The server for the centralized transaction system stores data relating to customers, vendors, and transactions. Customers access the server through client workstations to view historical information on transactions and to locate and save deals offered by vendors. Vendors access the server through client workstations to view historical transaction information and to create and offer deals to customers.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A system for a centralized transaction system is disclosed. The system, generally delineated as 100 in the figures, allows a customer 122 to store certain information before initiating a transaction 404 with a vendor 124. During the transaction 404, the stored information is used to complete the transaction.

Figure 1:
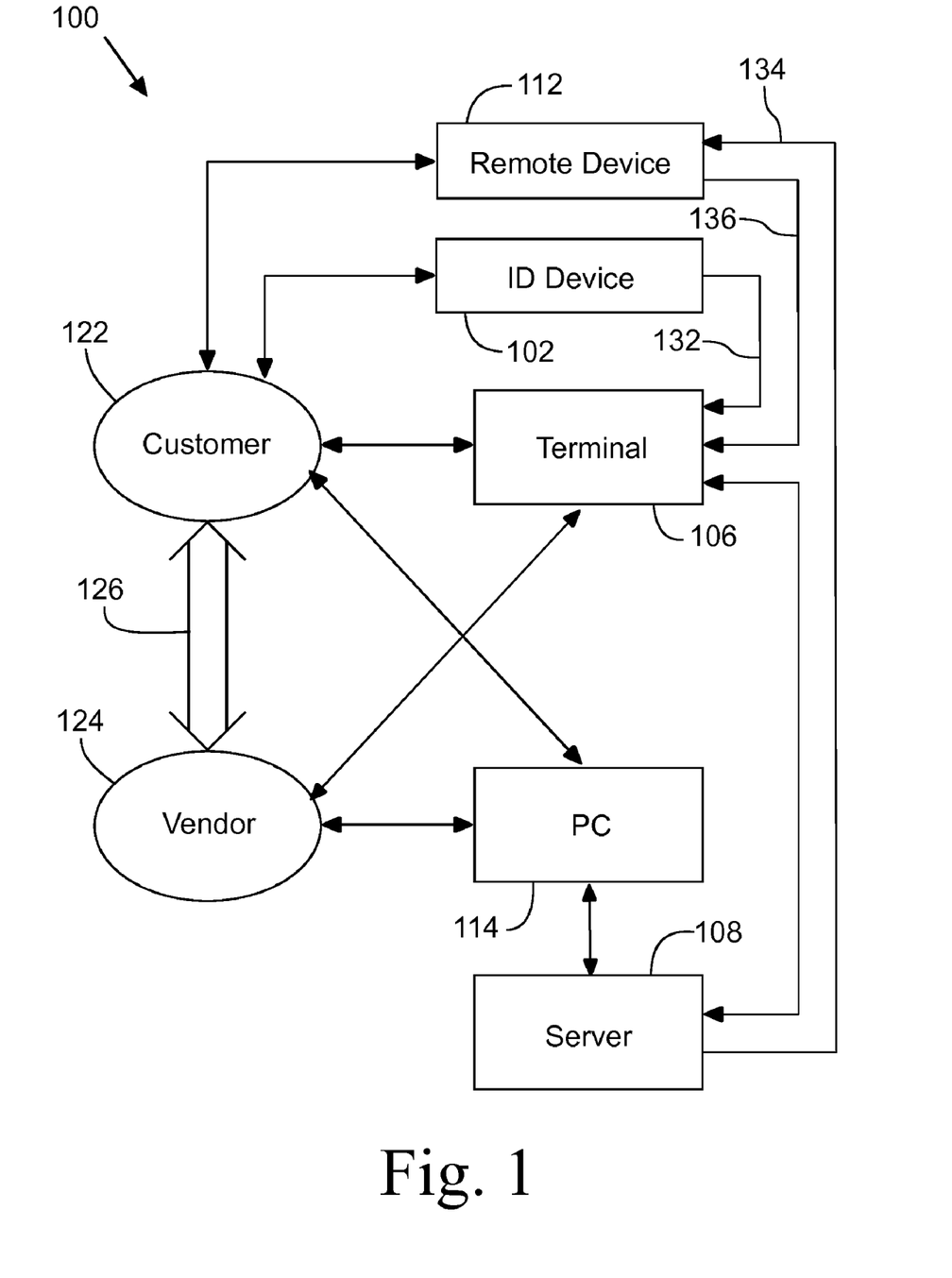
FIG. 1 is a data flow diagram of one embodiment of the centralized transaction system.

FIG. 1 illustrates a data flow diagram of one embodiment of the centralized transaction system 100. The centralized transaction system 100 has two classes of users: customers 122 and vendors 124. Customers 122 are those who purchase, rent, and/or lease from vendors 124, which are businesses that offer goods and/or services. The customers 122 and vendors 124 are external entities. The customer 122 completes a transaction to purchase goods and/or services 126 from the vendor 124. To accomplish the transaction, the customer 122 uses an identification (ID) device 102 to provide an identification code 132 to the terminal 106 operated by the vendor 124. The terminal 106 communicates the identification code 132 to the server 108, which sends an authentication code 134 to the remote device 112, which is in possession of the customer 122. The customer 122 sends a return code 136 to the terminal 106, which communicates the return code 136 to the server 108 for authentication of the customer 122. After the customer 122 is authenticated by the server 108, the customer 122 and vendor 124 continue the transaction. The customer 122 has the option of using payment information previously stored in the server 108 or other payment means to complete the transaction. After the transaction is completed, the terminal 106 communicates the transaction information to the server 108, and the server 108 processes that information.

Figure 3:
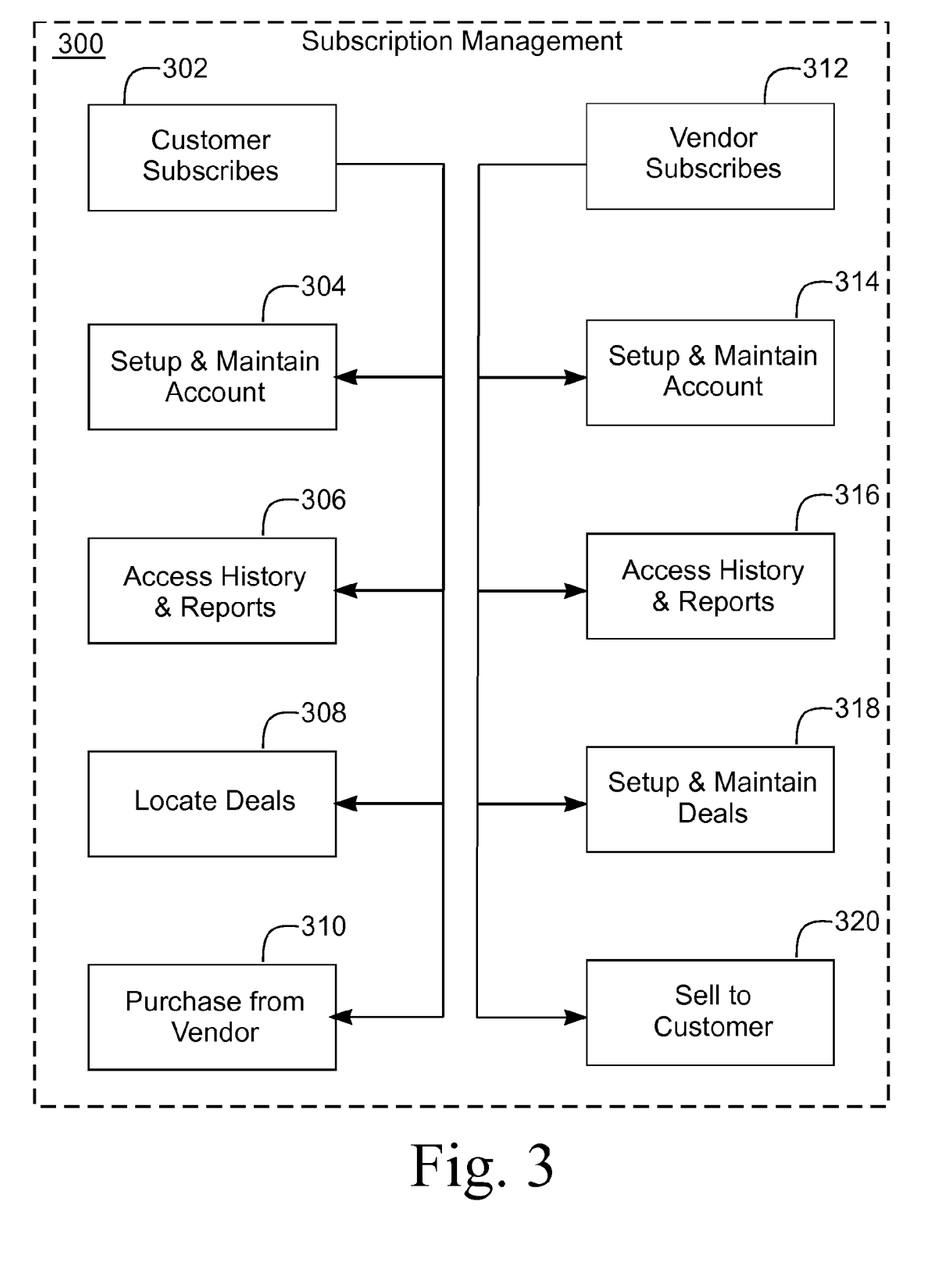
FIG. 3 is a block diagram of the subscriber management function showing the customer actions and the vendor actions.

Both the customer 122 and the vendor 124 use a workstation, or a personal computer (PC), 114 to communicate with the server 108. FIG. 3 illustrates the various interactions the customer 122 and the vendor 124 have with the server 108 through the workstation 114.

As used herein, a transaction is an exchange or transfer of goods and/or services 126 between a customer 122 and a vendor 124. Transactions include sales, rentals, leases, or other exchanges or transfers between a customer 122 and a vendor 124.

Purchase is defined broadly as a sale, rental, or lease of one or more goods or services by the customer 122 from the vendor 124 in exchange for money or other consideration paid to the vendor 124. The money paid to the vendor 124 includes cash or other legal tender, credit, gift certificates, or other things of value. In some cases, the money is paid to the vendor 124 over a period of time, such as with a layaway plan where the customer 122 pays for the merchandise over a period before receiving the merchandise from the vendor 124, or with a credit plan where the customer 122 contracts to pay for the merchandise after receiving the merchandise from the vendor 124.

Merchandise, as used herein, refers broadly to goods and/or services, both tangible and intangible, offered by the vendor 124. Gift certificates are one type of merchandise, at least for the first part of the life cycle of a gift certificate when a customer 122 purchases a gift certificate from a vendor 124. For the second half of the life cycle of a gift certificate, the gift certificate is equivalent to money when a customer 122 uses a gift certificate to pay for a purchase from a vendor 124.

A deal is an incentive offered by a vendor 124 to customers 122. Deals include coupons, rebates, and other incentive programs offered by vendors 124. A coupon entitles a customer to a discount or a specified price for the goods and/or services. A rebate is a refund of all or a portion of the purchase price and includes instant refunds that are given during the transaction and refunds payable after the transaction is completed.

Figure 2:
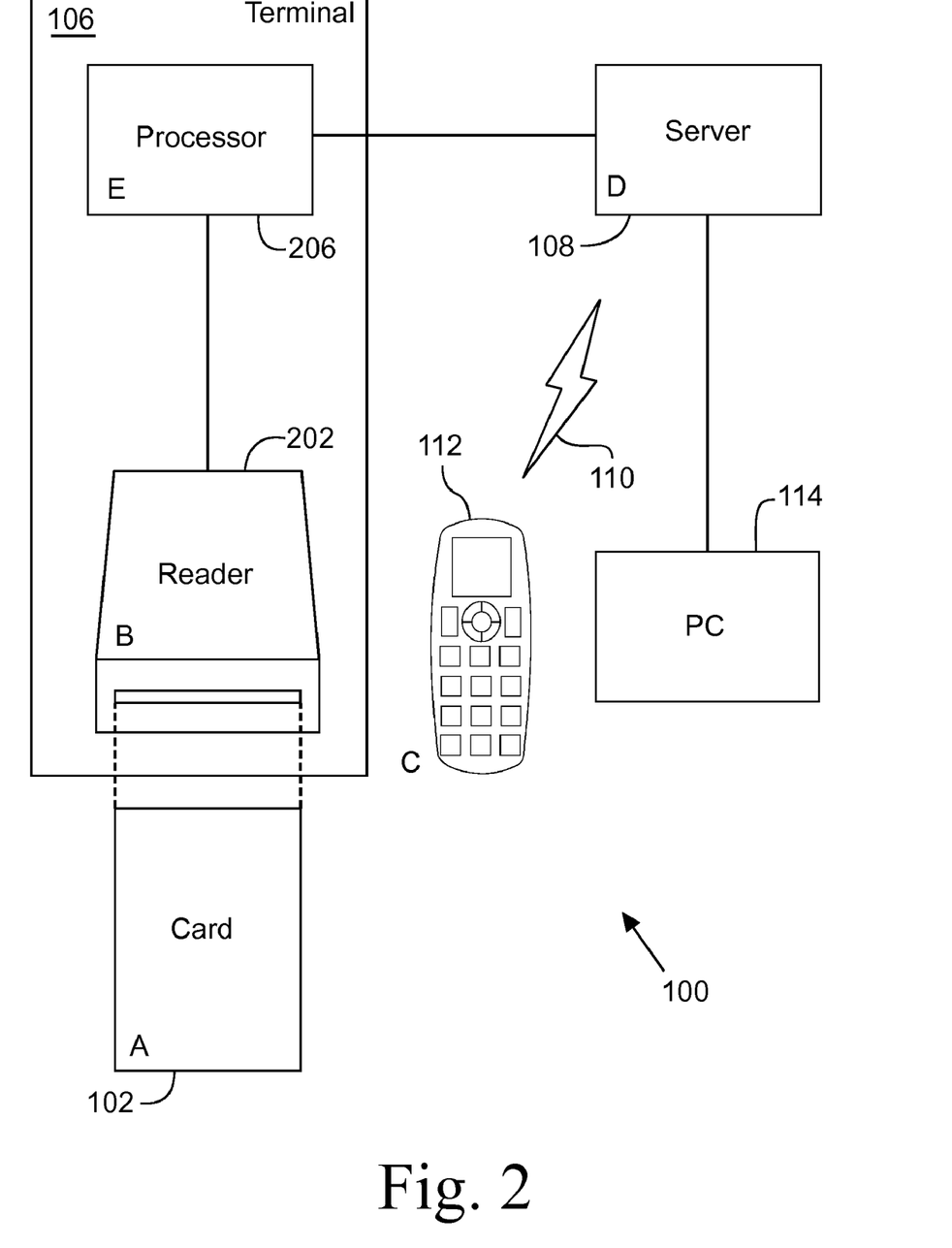
FIG. 2 is a symbolic pictorial view of the hardware associated with the centralized transaction system.

FIG. 2 illustrates a symbolic pictorial view of the hardware associated with the centralized transaction system 100. The server 108 communicates with a terminal 106 and a personal computer (PC) 114 over a network, such as the Internet. The server 108 also communicates with the remote device 112, such as a mobile telephone with text messaging and/or e-mail capability. In the illustrated embodiment, the terminal 106 includes a processor 206 and a reader 202 that accepts a card 102, which is a device in possession of the customer 122 that contains customer identification information. The processor 206 executes software that controls the terminal 106 and communicates with the server 108.

In the illustrated embodiment, the card 102 is the identification device 102 and the mobile telephone 112 is the remote device 112. These two devices 102, 112 are in the possession and/or control of the customer 122. The personal computer 114 is one of many client workstations to which the customer 122 and vendor 124 have access. In one embodiment, the terminal 106 is in the control of the vendor 124, such as when the vendor 124 operates a brick-and-mortar store or a convenience store where the terminal 106 is located at the establishment of the vendor 124 and is operated by the vendor 124. In another embodiment, the terminal 106 is the same as the workstation 114 and is operated by the customer 122 for an on-line transaction 404. In one such embodiment, the reader 202 is a software program or routine into which the customer 122 enters an identification code 132 associated with the customer 122. Also, in one such embodiment, the server 108 includes software for conducting the on-line transaction and for the centralized transaction system 100. The server 108 in such an embodiment includes one or more computer systems, with at least one of the computer systems running software controlled by the vendor 124 as an electronic storefront.

In one embodiment, the identification device 102 is a wallet-sized card that identifies the customer 122 possessing the card 102. The card 102, in various embodiments, includes a passive device, such as a magnetic stripe or bar code, or an active device, such as an RFID tag, that contains a code 132 that uniquely identifies the customer 122. In another embodiment, the identification device 102 is an electronic passkey or fob or a device with a transponder that contains a code 132 that uniquely identifies the customer 122. In still another embodiment, the identification device 102 is an intangible device associated with or recording the code 132 uniquely identifying the customer 122 to the centralized transaction system 100. In such an embodiment, the code 132 is known to the customer 122 and, in various embodiments, is either stored in a workstation 114 in which the customer 122 has access and/or control, in an e-mail message, on a piece of paper, or in the memory of the customer 122.

The reader 104 is a device that accepts the code 132 contained by the identification device 102. In the illustrated embodiment, the reader 202 is a card reader into which the card 102 is inserted. The reader 202 interacts with the card 102 to read the code 132 contained in the card 102. In another embodiment, the reader 104 is a device that interacts with the identification device 102 to read the code 132 contained in that identification device 102. In still another embodiment, the reader 202 includes a keyboard or other input device for the manual entry of the customer's code, which, in one embodiment, is printed or otherwise affixed to the identification device 102. In another such embodiment, the customer 122 manually enters a memorized code 132 into the reader 202 without the use of an identification device 102.

In the illustrated embodiment, the reader 202 is integrated with the terminal 106, which is a device such as a cash register or point-of-sale terminal. In other embodiments, the reader 202 is separate from, but communicates with, the terminal 106. The terminal 106 includes a processor 206 that executes software that communicates with the server 108. Both the terminal 106 and the workstation 114 are clients of the server 108. Further, as used herein, a "client" should be broadly construed to mean any computer or component thereof directly or indirectly connected or connectable in any known or later-developed manner to a computer network, such as the Internet or a local area network. Examples of a client include, but are not limited to, a personal computer, a terminal that communicates over the Internet, and an Internet connected television. Both the terminal 106 and the workstation 114 run or execute software that communicates with the server 108.

The server 108 is connected to a network such as the Internet or other wired network, which allows communication with the terminal 106 and workstation 114, or a wireless network, which allows communication with the remote device 112. The term "server" should be broadly construed to mean one or more computers, computer platform, an adjunct to a computer or platform, or any component thereof that provides data or information to a client. The server 108 runs, or executes, software that allows it to properly handle and process client 106, 114 requests, in addition to other processes necessary for the server 108 to perform its required functions. Of course, a client should be broadly construed to mean the equipment that requests or gets a file or information, and a server is the equipment that provides the file or information to multiple clients. These terms are based on the function of the associated equipment and the terms may interchange as the function of a particular piece of equipment changes.

In one embodiment, the server 108 executes software providing web server functions and allowing access by the clients 106, 114 through browser type software running on the clients 106, 114. In one such embodiment, the server 108 and clients 106, 114 communicate through HTML (hypertext markup language), which broadly includes the various formats for communicating over the world wide web, including xhtml. For an HTML based system, the client 106, 114 runs or executes software that communicates with the server 108. The client software is typically known as browser software, and in one embodiment, is a standard web browser such as Netscape, Firefox, or Microsoft Internet Explorer. In other embodiments, custom software performs the functions of the browser software. The browser software executes on the client 106, 114 and performs the functions of communicating with the server 108, displaying data and information provided by the server 108, sending user input from the client 106, 114 to the server 108, and processing applets or sub-routines. Browser applets or sub-routines are programs executed on the client 106, 114 that are controlled by the browser software to perform special functions not normally available in the browser software.

The remote device 112 in the illustrated embodiment is a mobile telephone that receives information from the server 108. In other embodiments, the remote device 112 is a portable device capable of receiving a code 134 from the server 108 and either displaying that code 134 so it can be entered into the terminal 106 or communicating the code 134 to either the reader 202 or the terminal 106. In still another embodiment, the remote device 112 is an e-mail client program or an instant messaging client program that receives a code 134 from the server 108 and allows the customer 122 to access that code 134 through an authentication process associated with the client program. To authenticate the customer 122 associated with the identification code 132, the server 108 sends an authentication code 134 to the remote device 112 and a return code 136 is then received by either the reader 104 or the terminal 106 and communicated back to the server 108. Because the rightful possessor of the card 102 is also expected to have possession of and/or access to the remote device 112, the customer 122 is authenticated to be authorized to complete transactions with the customer 122 having the identification code 132.

FIG. 3 illustrates a block diagram of the subscription management 300 software showing the customer 122 actions and the vendor 124 actions. The centralized transaction system 100 has registered, or subscribed, users, including customers 122 and vendors 124.

Initially, the customer 122, by accessing the server 108 via the workstation 114, subscribes 302 to the centralized transaction system 100. Likewise, the vendor 124, by accessing the server 108 via the workstation 114, initially subscribes 312 to the centralized transaction system 100. Every customer 122 and every vendor 124 desiring to use the system 100 must sign up, or subscribe, to the centralized transaction system 100. For users (customers 122 and vendors 124) to subscribe 302, 312, the user 122, 124 provides name and contact information, which is stored on the server 108. In one embodiment, the identity of the user 122, 124 is verified. In one such embodiment, the identity of a user 122, 124 is verified by comparing information provided by the user 122, 124 with information from a third party. The information provided by the user 122, 124 is confidential information or information that is not publicly known about the customer, such as a driver's license number or credit card or bank account information. For example, the driver's license number of the individual user 122, 124 is verified by a state agency issuing the driver's license. Another example is a financial institution verifying credit card or other financial account information. In another embodiment, the user 122, 124 is verified by the server 108 causing a mailing to be sent to a physical address given by the user 122, 124, who is then required to respond in accordance with instructions in the mailing. For example, the mailing is a postcard containing a code with instructions for the user 122, 124 to visit a web site and enter the code to verify receipt of the postcard.

After subscribing 302, the customer 122 is able to set up and maintain an account 304, access history information and reports 306, locate deals 308, and purchase from on-line vendors 310. Setting up and maintaining an account 304 includes the customer 122 saving, accessing, changing, and verifying the data stored on the server 108. In various embodiments, the data includes name and contact information for the customer 122; financial institution information such as credit/debit card information and bank account information; demographic information such as age, gender, income, race; and the customer's preferences. The data also includes information on deals, including rebates. Preference data includes the preferred payment account for specific vendors 124 and/or types of transactions, such as convenience transactions with an amount above or below a specified amount. In one embodiment, preference data also includes identification of a customer code, which is used as a password. In one such embodiment, the customer code is sent from the server 108 to the remote device 112 along with, or part of, the authentication code 134. In another such embodiment, the customer code is added to the authentication code 134 to form the return code 136 sent to the server 108.

The customer 122 also accesses history and reports 306. As the customer 122 uses the centralized transaction system 100, the customer 122 accumulates a history of transactions with various vendors 124, including a catalog of merchandise purchased by the customer 122. In various embodiments, the transaction history information allows the customer 122 to obtain information and reports on such matters as the vendors 124 that the customer 122 has dealt with, the amount saved with each vendor 124 over specified periods, the value of deals obtained over specified periods and where those deals were located, rebate and post-transaction information, financial information, such as balances and amount spent, and warranty information relating to the purchased merchandise.

The customer 122 locates deals 308 through the centralized transaction system 100. In one embodiment, deals are offered to customers 122 through the centralized transaction system 100. In one such embodiment, the customer 122 has the option of searching for deals associated with specific products and/or vendors. In another embodiment, the vendor 124 offers deals to customers 122 through an on-line offer on a vendor 124 controlled web site. In either embodiment, the customer 122, once a deal is located, selects the deal to save the deal on the centralized transaction system 100. In another embodiment, the vendor 124 offers deals through other media, such as print media, and the customer 122 saves the deal 308 by entering a deal number through the subscription management 300. The locate deals 308 routine allows the customer 122 to save deals and to maintain a list of located and saved deals.

In one embodiment, the vendor 124 allows the customer 122 to purchase 310 from the vendor 124 through the server 108. The customer 122 has several options available for purchasing merchandise from vendors 124. The customer 122 is able to purchase from a physical store location, such as a brick-and-mortar store, from a web site maintained and/or controlled by the vendor 124, and/or from a vendor 124 who offers to sell 320 merchandise directly to the customer 122 through the centralized transaction system 100.

The vendor 124, by accessing the server 108 via the computer 114, initially subscribes 312 to the centralized transaction system 100. After subscribing 312, the vendor 124 is able to set up and maintain an account 314, access history information and reports 316, set up and maintain deals 318, and sell on-line 320.

For the vendor 124, setting up and maintaining an account 314 includes the vendor 124 saving, accessing, changing, and verifying the data stored on the server 108. In various embodiments, the data includes name and contact information for the vendor 124, including authorized persons for accessing the vendor's account; financial information such as a bank account for receiving payments from customers 122; demographic information such as location, number of locations, number of customers per period and volume of business per period; vendor stationary and elements such as designs, logos, slogans, and other trademarks the vendor 124 allows the centralized transaction system 100 to use in promoting the system 100; list of goods and/or services offered by the vendor 124; patron programs; and the vendor's preferences. A patron program is a program offered by the vendor 124 in which customers 122 are permitted to receive special benefits, such as special discounts and coupons, newsletters and flyers, points, and such, in exchange for the customer 122 signing up for the patron program. Vendor preferences include the level of authentication required for customers 122 to make purchases of selected value.

The vendor 124 also accesses history and reports 306. As the vendor 124 uses the centralized transaction system 100, the vendor 124 accumulates a history of transactions with various customers 122. In various embodiments, the transaction history information allows the vendor 124 to obtain information and reports on such matters as the customers 122 that the vendor 124 has dealt with, the amount of deals offered and accepted from customers 122 over specified periods, rebate and post-transaction information, and financial information, such as balances and amounts received.

The vendor 124 has the option to set up and maintain deals 318. Deals include special offers, discounts, rebates, points or any other incentive that the vendor 124 desires to offer to customers 122. In one embodiment, the deals are offered to customers 122 who use the locate deals 308 feature. In another embodiment, the deals are offered through on-line Internet-based shopping sites and/or at brick-and-mortar stores.

Figure 4:
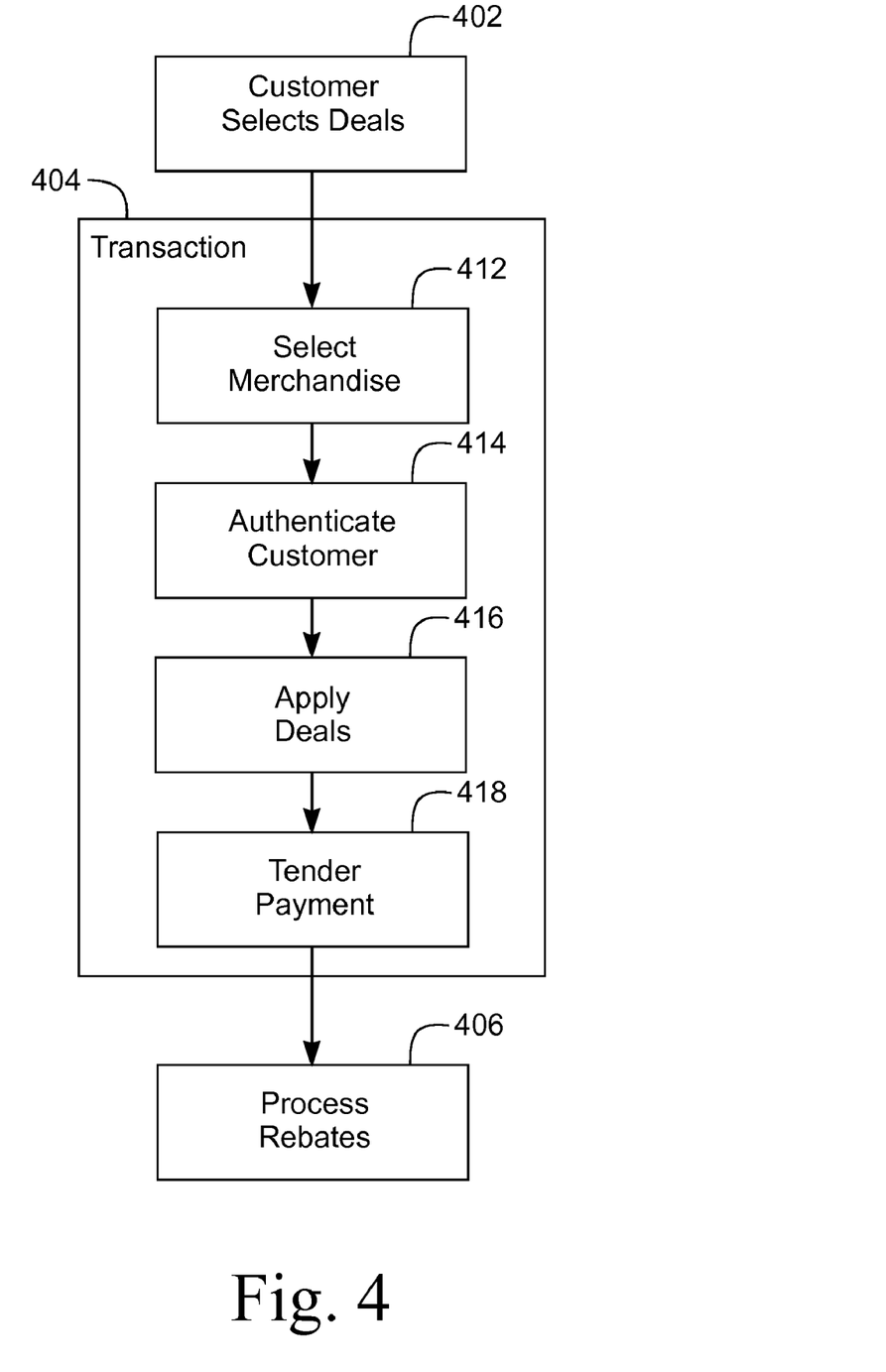
FIG. 4 is a block diagram of one embodiment of the steps for completing a transaction.

FIG. 4 illustrates a block diagram of one embodiment of the process for completing a transaction using the centralized transaction system 100. The first step is for the customer 122 to select one or more deals 402. The deals are selected after the customer 122 locates the deals, such as through the subscription management 300 routine executed through the server 108. After the deals, if any, are selected 402, the customer 122 completes a transaction 404 to purchase merchandise from a vendor 124. After the transaction 404 is completed, the rebates, if any, are processed 406.

The transaction step 404 includes the steps of selecting the merchandise 412, authenticating the customer 414, receiving the appropriate deals 416, and then tendering payment 418. For transactions 404 completed on-line, such as over the Internet, the step 412 of selecting the merchandise includes the customer 122 accessing, via the workstation 114, information on the goods and/or services offered by the vendor 124. For transactions 404 completed at a brick-and-mortar store, such as found in a shopping or neighborhood center, the step 412 of selecting the merchandise includes the customer 122 selecting the goods and/or services physically.

To ensure that the customer 122 is authorized to tender payment 418 for the transaction 404, the customer 122 is authenticated 414. The level of authentication is determined by the customer 122 and the vendor 124 through subscription management 300. In one embodiment, the customer 122 provides an identification code 132 to the vendor 124 and the code 132 is sent to the server 108. The server 108 responds with an authentication code 134 sent to the customer 122, who then provides a return code 136 to the vendor 124. If the return code 136 matches the authentication code 134 that the server 108 sent out or is otherwise verified by the server 108, then the transaction 404 is permitted to proceed. In another embodiment, presentation of the identification device 102 by the customer 122 is sufficient to authenticate the customer 122.

After authentication 414, the deals associated with the transaction 404 are applied 416. Such deals include the located deals saved by the customer 122, such as through the located deals 308 function of the subscription management 300. In another embodiment, the deals are deals in which the vendor 124 applies to the transaction 404 of the vendor's own volition. In still another embodiment, the deals are associated with the customer 122 being identified as being a patron of the vendor 124.

After the deals are applied 416, the customer 122 tenders payment 418 for the transaction 404. In various embodiments, the customer 122 has selected, through subscription management 300, a preferred payment account for the specific vendor 124 or type of transaction, such as a transaction 404 with a specified value or for a specified type of merchandise. In another embodiment, the customer 122 selects a specific payment account from one or more accounts previously specified through subscription management 300 and payment is tendered using one of the saved accounts. In still another embodiment, the customer 122 tenders payment 418 with payment other than as previously specified through subscription management 300. For example, the customer 122 chooses to pay for the transaction 404 with cash. For on-line or electronic based transactions 404, the customer 404 receives an electronic receipt, which, in various embodiments, is a receipt sent via electronic messaging, such as e-mail, and/or a receipt received by the server 108 that is made available to the customer 122 through subscription management 300 option of accessing history and reports 306. For brick-and-mortar type transactions 404, the customer 122 is given the option to receive a printed receipt and/or an electronic receipt.

After the transaction 404 is completed, the rebates, if any, are processed 406. In one embodiment, the vendor 124 offers rebates by requiring the customer 122 to perform some action, for example, request a refund through a rebate program. In other embodiments, the vendor 124 offers rebates that are immediately deducted from the purchase price, in which case the rebate is treated as a deal, or by refunding all or a portion of the purchase price to the customer 124 after the transaction 404 is completed. In one embodiment, the rebates are processed by the server 108, which receives the information from one or both of the customer 122 and the vendor 124, tracks the rebate handling, and credits the account of the customer 122 and debits the account of the vendor 124.

Figure 5:
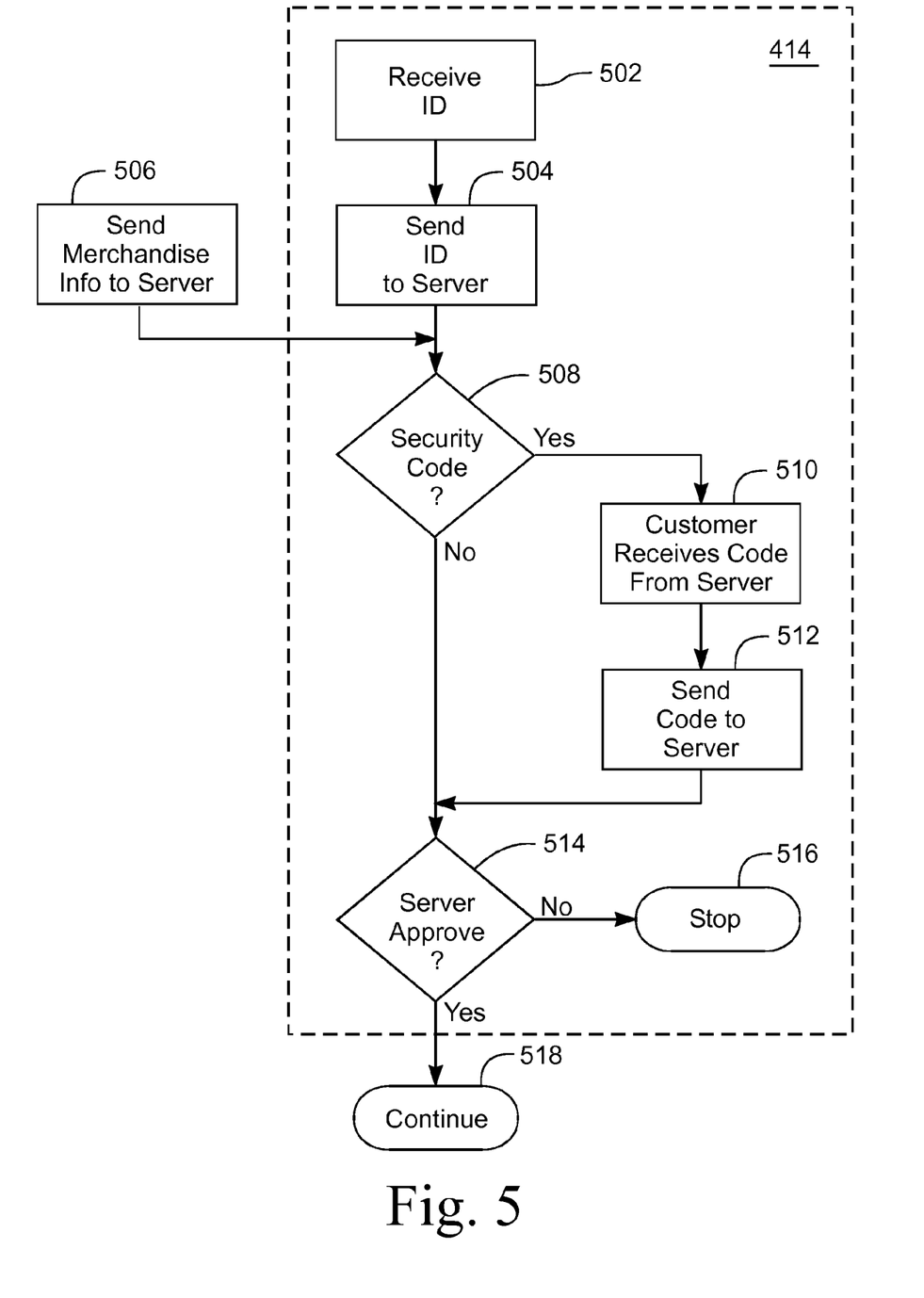
FIG. 5 is a block diagram of one embodiment of the steps to authenticate a customer.

FIG. 5 illustrates a block diagram of one embodiment of the process to authenticate 414 a customer 122 through the centralized transaction system 100 during a transaction 404. The terminal 106 receives the identification 502 from the customer 122. In one embodiment, the terminal 106 receives the identification 502 by reading the identification code 132 from the card 102 when the card 102 interfaces with the reader 202. In another embodiment, the customer 122 or vendor 124 enters the identification code 132 in the terminal 106, such as via a keyboard.

The terminal 106 sends the identification code 132 to the server 504. The terminal 106 also sends the merchandise information to the server 506. The server 108 determines whether a security code, or an authentication code, 134 is required 508 by evaluating the identification code 132, the merchandise being purchased, and the identity of the vendor 124, which the server 108 knows by virtue of the communication with the terminal 106. If a security code 134 is required 508, the server 108 generates and sends an authentication code 134 to the remote device 112. The customer 122 receives 510 the authentication code 134 from the server 108 and a return code 136 is transferred to the terminal 106, which sends 512 the return code 136 back to the server 108. The server 108 verifies the return code 136 against the authentication code 134 and if the server 108 does not approve 514, the transaction stops 516. If the server 108 approves 514, the transaction continues 518.

If a security code 134 is not required 508, then the next step is to have the server approve 514 the transaction. If the server approves 514, the next step is to continue 518, otherwise, the transaction stops 516.

In one embodiment, step 508, which determines whether a security code 134 is required, includes the server 108 considering the options selected by the customer 122 when the customer 122 sets up and maintains an account 304. For example, the customer 122 determines that purchases below a specified value do not require authentication and can be completed upon presentation of the customer identification card 102. Transactions exceeding the specified value require authentication and the server 108 sends a code 134 that is received by the customer 510. In another example, the customer 122 determines that transactions with specific vendors 124, such as convenience stores or gas stations, do not require authentication.

Figure 6:
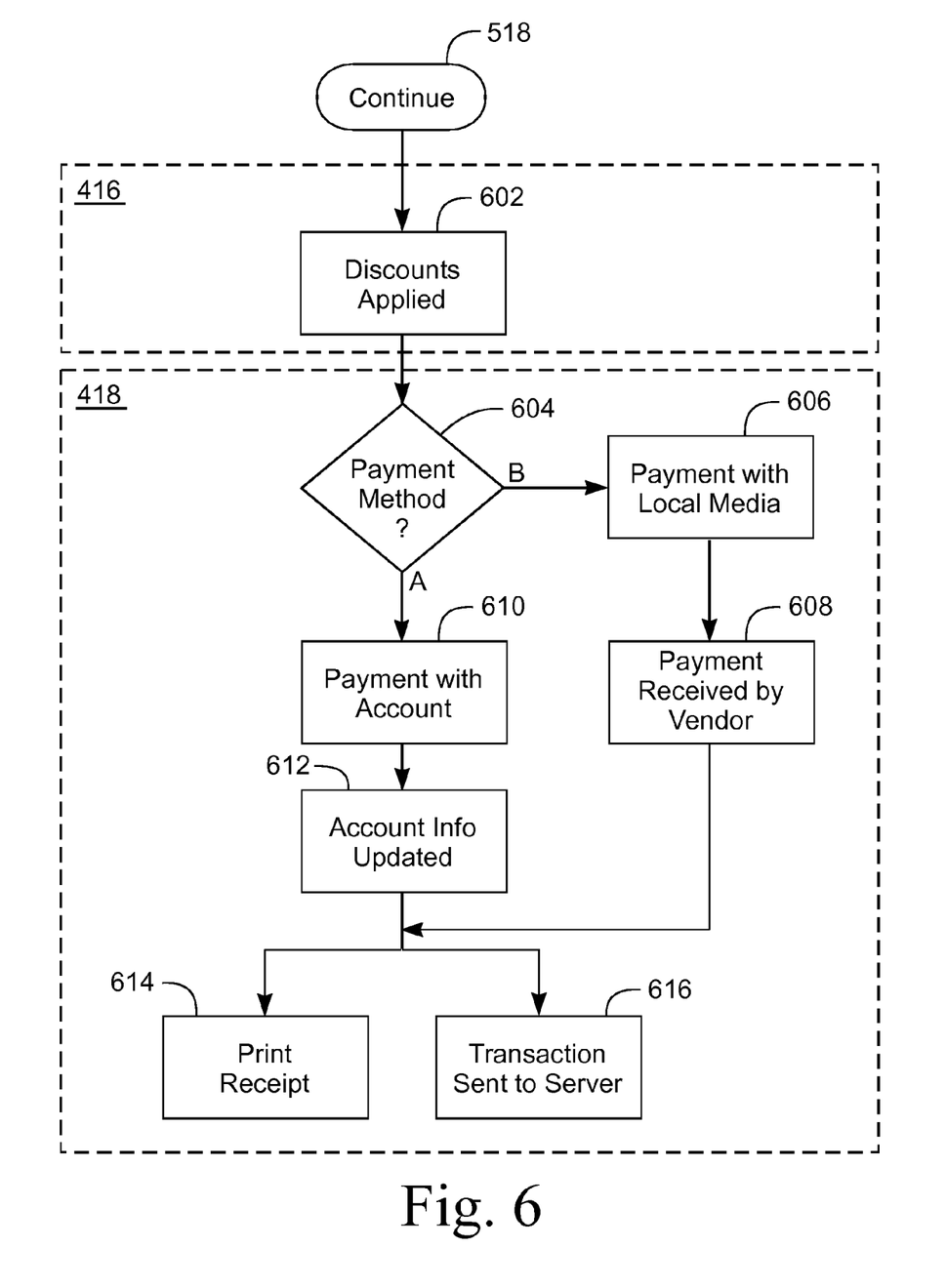
FIG. 6 is a block diagram of one embodiment of the steps to pay for a transaction.

FIG. 6 illustrates a block diagram of one embodiment of the steps for applying the deals 416 and tendering payment 418 during a transaction 404 through the centralized transaction system 100 and continues 518 from FIG. 5. After the server approves 514, the discounts are applied 602 to the transaction. In one embodiment, the discounts are based on the deals located and selected by the customer 122. In another embodiment, the discounts are those offered by the vendor 124 for all or selected transactions.

The next step is the selection of payment method 604. In one embodiment, the customer 122 has pre-determined and stored with the server 108 information on a preferred payment method for a specific vendor 124 or type of transaction. For example, the customer 122 determines during subscription management 300 that a specific vendor 124, such as a convenience store, or a specific type of transaction, such as an automotive fuel purchase, should be paid by a specified account, such as a credit card. If the server 108 determines that the vendor 124 or transaction meets the requirements set by the customer 122, then payment with the specified account 610 is made and the account information is updated 612 by the server 108. If the transaction does not meet the requirements, then the customer 122 makes payment with local media 606, such as cash or a credit/debit card, and the payment is received by the vendor 608. In another embodiment, the customer 122 has specified multiple accounts that are available for payment and the customer 122 selects one of those accounts to make payment 610 to the vendor.

After the vendor is paid 608, 612, a receipt is printed 614 and the transaction information is sent to the server 616. After the transaction 404 is completed, the customer 122 has access to the transaction via the subscription management 300. In one embodiment, the customer 122 has pre-selected the option to not have paper receipts printed by the vendor 124.

Figure 7:
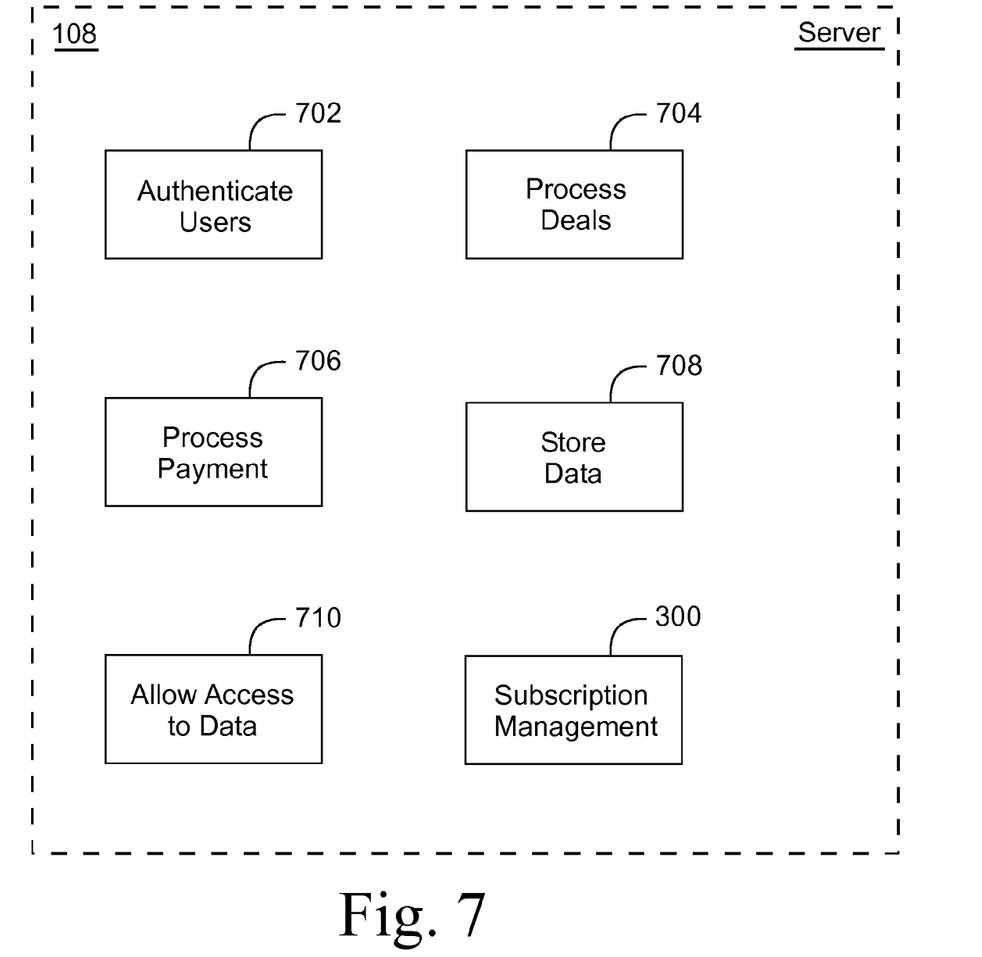
FIG. 7 is a block diagram of one embodiment of the routines performed by the server.

FIG. 7 illustrates a block diagram of one embodiment of various programs or routines performed by the server 108. The server 108 performs various functions for the centralized transaction system 100. One function is to authenticate users 702, which in one embodiment includes receiving an identification code 132, sending an authentication code 134, and verifying the return code 136 from the user 122, 124 received from the customer 122 or the vendor 124. In one embodiment, the function of authenticating users 702 includes authenticating customers 122 and vendors 124, such as when customers 122 and vendors 124 access the subscription management 300 function. In still another embodiment, the function of authenticating users 702 includes authenticating vendors 124, such as when the vendor 124 operates the terminal 106 and/or the workstation 114.

Another function is to process deal information 704. Deals are created and saved by vendors 124 through the subscription management 300 option to the set up and maintain deals 318. In various embodiments, the deals are offered to customers 122 through the centralized transaction system 100, through on-line stores and web sites, through advertisements, and/or through physical media offered through brick-and-mortar locations. The customer 122 locates one or more deals, and, through the locate deals 308 option in the subscription management 300, saves the deals for a transaction 404. During the transaction 404, the server 108 communicates the saved deal information to apply the deals 416 during the transaction. If the vendor 124 has other deals available for the customer 122 during the transaction 404, the server 108 includes those deals in the apply deals step 416.

Figure 9:
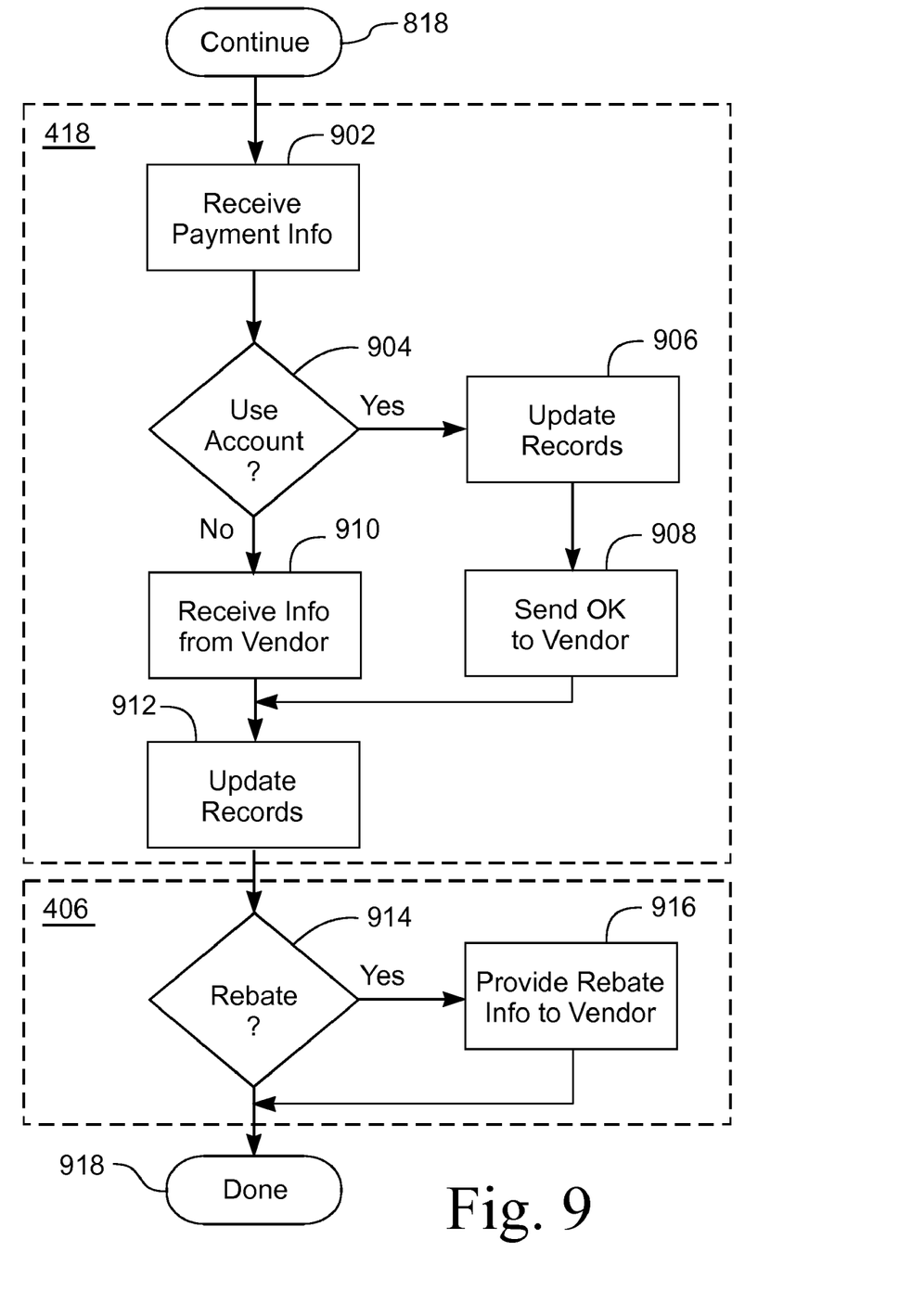
FIG. 9 is a block diagram of one embodiment of the steps performed by the server with respect to payment of the transaction.

The server 108 processes payments 706, such as by performing the steps illustrated in FIG. 9.

The server 108 stores data 708 and allows access to that data 710. Because all transactions 404 pass through the server 108, the server 108 obtains information relating to each transaction 404, including the associated customer 122 and vendor 124, the deals applied, and how payment was tendered for the transaction 404. The server 108 stores this information for later data mining and reporting to customers 122 and vendors 124.

The server 108 also processes the subscription management 300 functions. The centralized transaction system 100 applies information and preferences of customers 122 and vendors 124 to facilitate transactions 404 as shown in FIG. 3.

Figure 8:
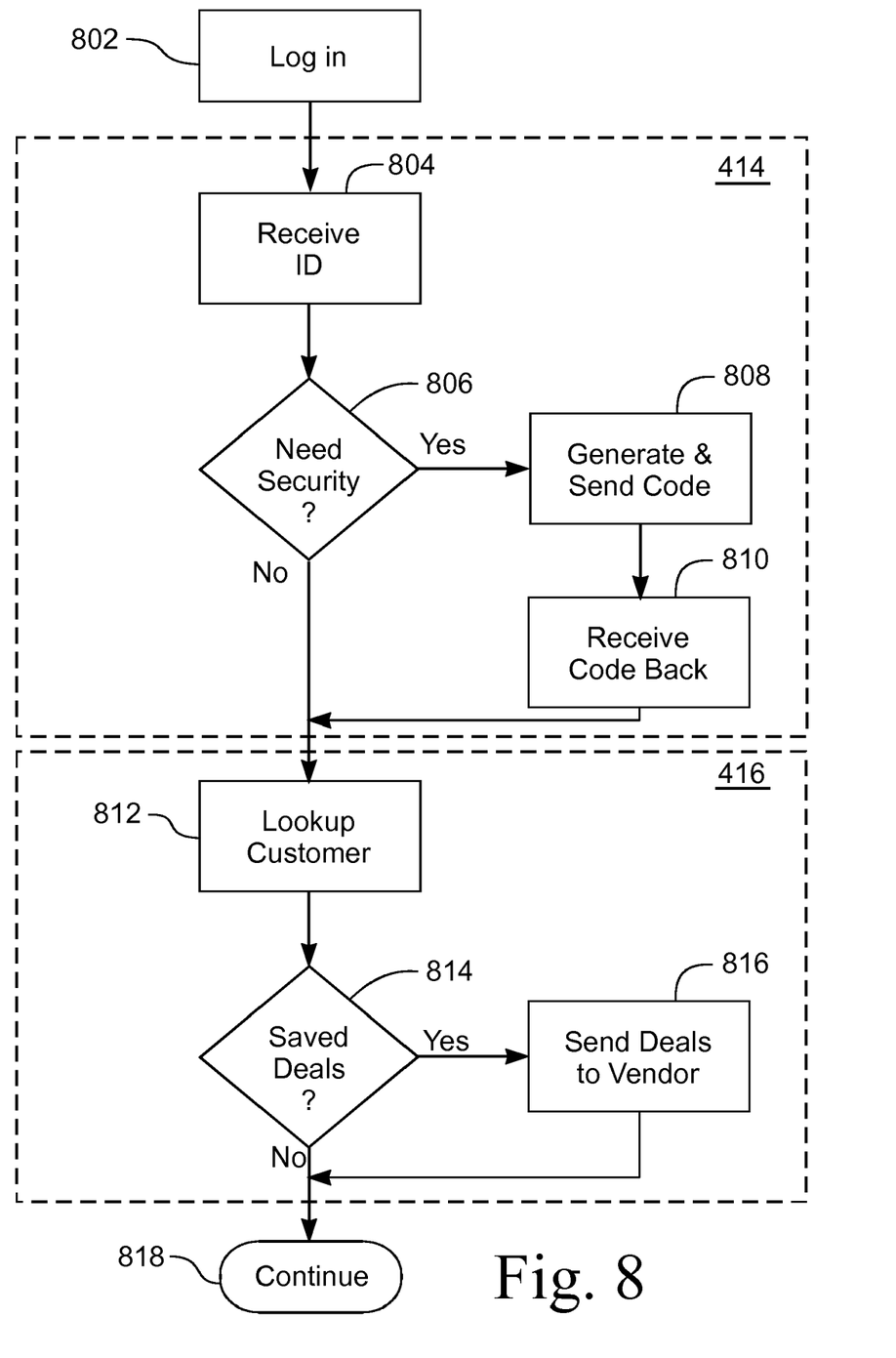
FIG. 8 is a block diagram of one embodiment of the steps performed by the server to authenticate the customer and identify deals for the transaction.

FIG. 8 illustrates a block diagram of one embodiment of the steps performed by the server 108 to authenticate 414 the customer 122 and apply deals 416 for a transaction 404. The illustrated embodiment is one in which the web site host, for an on-line transaction, or the terminal 106, for a brick-and-mortar transaction, performs a portion of the processing for the transaction 404.

The first step 802 is to log in to the server 108. For an on-line transaction, the customer 122 logs onto a web site that is linked to the server 108. The web site is controlled and maintained by a web site host, which, in one embodiment, is a vendor 124 and the web site host communicates with the server 108. In another embodiment, the web site host is the server 108 for a specific vendor 124. In another embodiment, the customer 122 is not required to log in 802 to a web site because the authentication procedure 414 performs the function of the log in step 802.

For brick-and-mortar based transactions in which the vendor 124 uses a terminal 106 to conduct the transaction, the vendor 124 logs onto the server 108 via the terminal 106. In various embodiments, the vendor 124 logs in 802 once per transaction 404 or once per operating period, such as a day or shift, or the terminal 106 automatically logs onto the server 108.

The next step 804 is for the server 108 to receive the identification code 132 of the customer 122. For on-line transactions, in various embodiments, the identification code 132 is entered by the customer 122, is transferred by a cookie, or is otherwise transferred from the customer 122 to the server 108 via the workstation 114. For brick-and-mortar transactions, in various embodiments, the identification code 132 is entered manually by the customer 122, is transferred from an identification device 102, or is entered by the vendor 124 from information provided by the customer 122.

The next step 806 is for the server 108 to determine if security is needed, that is, if the server 108 needs to process an authentication code 134. In one embodiment, the customer 122 has selected through subscription management 300 that a specific vendor 124 or type of transaction is not subject to authentication. In another embodiment, the vendor 124 has selected through subscription management 300 that a specific customer 122, type of customer, or type of transaction is not subject to authentication.

If an authentication code is not required 806, the server 108 proceeds with the step 812 of looking up the customer 122. If an authentication code 134 is required 806, the server 108 generates and sends 808 the code 134 to the remote device 112, which is in the possession or control of the customer 122. After the customer 122 receives the code 134 and sends the return code 136 to the server 108, the server 108 receives 810 the return code 136. If the received return code 136 is verified against the generated and sent code 134, the server 108 proceeds to the next step. In one embodiment, the server 108 includes in or with the authentication code 134 a customer code known to the customer 122. In such an embodiment, the customer 122 is assured of the authenticity of the authentication code 134 received from the server 108. In another such embodiment, the customer 122 includes with the authentication code 134 a customer code, which serves as a password, and sends as the return code 136 the combination of the authentication code 134 and customer code. In such an embodiment, the server 108 is double assured that the customer 122 is authenticated because of receipt of the authentication code 134 and the customer code as the return code 136.

The next step 812 is for the server 812 to lookup the customer 812 and retrieve data specific to that customer 122. The retrieved data, in various embodiments, includes available accounts, preferred account, saved deals, and customer preferences.

The next step 814 is for the server 812 to determine if there are any saved deals for that customer 122. Based on the customer's 122 data, the server 108 determines whether the customer 122 has previously located and saved any deals 308. If there are saved deals 814, the next step 816 is for the server 108 to send the deal information to the vendor 124 and then to continue 818 as illustrated on FIG. 9. If there are no saved deals 814, the next step continues 818 on FIG. 9.

FIG. 9 illustrates a block diagram of one embodiment of the steps of tendering payment 418 and processing rebates 406 as performed by the server 108.

For tendering payment 418, the first step 902 after continuing 818 from FIG. 8 is for the server 108 to receive payment information. When setting up and maintaining an account 304, the customer 122 has the option of identifying a specific payment account to be used for transactions 404. Alternatively, the customer 122 has the option of specifying that the payment account is to be selected during the transaction 404. For those vendors 124 and/or those transactions that the customer 122 has not pre-selected a specific payment account, the server 108 receives information from the customer 122 for on-line transactions or from the vendor 124 for brick-and-mortar transactions, relating to whether a customer stored account is to be used to pay for the transaction 404 or if the customer 122 prefers to pay for the current transaction 404 via other means.

The next step 904 is for the server 108 to determine whether to use saved account information. If the server 108 determines that saved account information is to be used for the transaction 404, then the server 108 updates the records 906 to account for the transaction amount. The next step 908 is for the server 108 to send an OK message to the vendor 124 indicating that the server 108 will handle debiting the customer's 122 account and the vendor 124 will be paid for the transaction 404. If the server 108 determines that saved account information is not to be used for the transaction 404, then the next step 910 is for the server 108 to receive payment information from the vendor 124.

As discussed previously, the customer 122 controls how payment is to be made for a transaction 404. The server 108 accesses the data to determine whether the customer 122 has specified how payment is to be made, and the server 108 also receives input from the customer 122, through the vendor 124, if a different account is to be used.

The next step 910 is for the server 108 to update the data records stored by the server 108. The data records include information on the details of the current transaction 404, such as merchandise purchased, the deals used, and the account used in the transaction 404.

For the step of processing rebates 406, the next step 914 is for the server 108 to determine if a rebate applies to the transaction 404. If no rebate applies, the server 108 is done 918 processing the transaction 404. If a rebate applies, the server 108 provides the rebate information to the vendor 916. In one embodiment, the vendor 124 prints rebate certificates for the customer 122 to redeem after the transaction 404 is completed. The server 108 is then done 918 processing the transaction.

Figure 10:
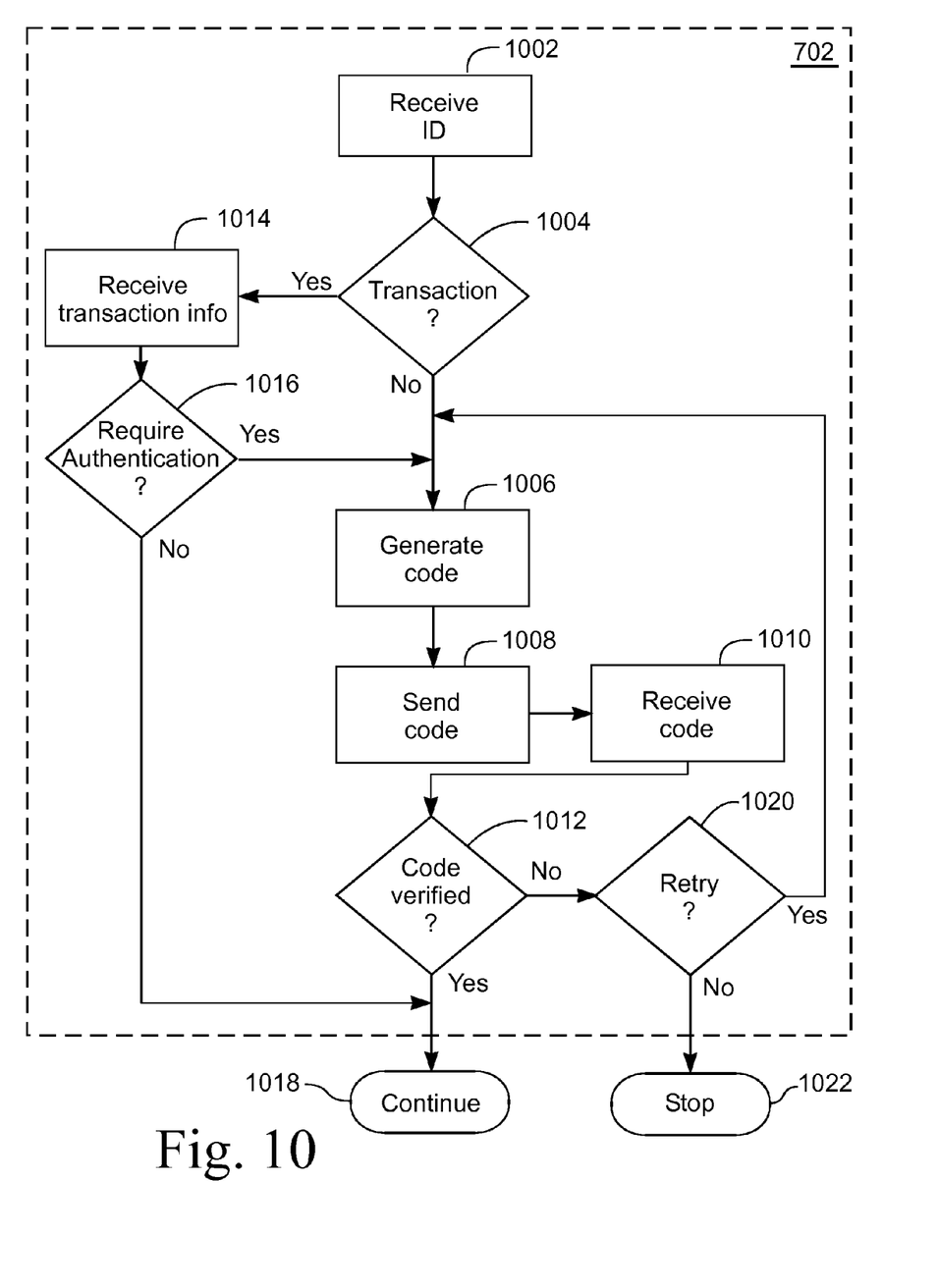
FIG. 10 is a block diagram of one embodiment of the steps performed by the server in authenticating a user.

FIG. 10 illustrates a block diagram of one embodiment of the steps performed by the server 108 to authenticate a user 702, where the user is either a customer 122 or a vendor 124. In one embodiment, authentication of the customer 414 is performed as part of a transaction 404. In another embodiment, authentication of a user 702 is performed before a customer 122 or a vender 124 is permitted access to the server 108, such as through subscription management 300.

The first step 1002 is for the server 108 to receive an identification code 132 from a user 122, 124. Each identification code 132 is unique to each customer 122 and vendor 124. In various embodiments the identification code 132 is associated with an identification device 102 or is a alphanumeric sequence known by the user 122, 124.

Once the identification code 132 is received 1002, the server 108 determines 1004 whether the code 132 was received as part of a transaction 404. If the authentication 702 is part of a transaction 404, the server 108 requests and receives information 1014 identifying the merchandise and vendor 124 associated with the transaction 404. The received information is then evaluated to determine 1016 whether authentication is required. If authentication is not required, authentication 702 is complete and the routine continues 1018 with the next step after authentication 702.

If the server 108 determines 1004 that the code 132 was not received as part of a transaction 404 or that the transaction 404 requires authentication 1016, then the server 108 generates 1006 an authentication code 134 and sends 1008 the code 134 to the user 122, 124. In various embodiments, the user 122, 124 receives the authentication code 134 on a remote device 112, such as a mobile telephone or other electronic messaging client. The user 122, 124 then causes a return code 136 to be returned to the server 108. In various embodiments, the user 122, 124 returns the return code 136 by typing it into an electronic messaging client or giving it to the vendor 124 such as during a transaction 404.

In one embodiment, the return code 136 is identical to the authentication code 134. In another embodiment, the customer 122 has a customer code, which is saved on the server 108. The authentication code 134 includes the customer code, thereby allowing the customer 122 to verify the authenticity of the received authentication code 134. In still another embodiment, the customer 122 has a customer code, which is saved on the server 108 and treated as a password by the customer 122. The return code 136 sent by the customer 122 includes the authentication code 134 and the customer code, thereby allowing the server 108 to further authenticate the customer 122 by assuring that the customer's identification code 132 and remote device 112 are not being used by an unauthorized user.

After the user 122, 124 returns the code 136, the server 108 receives 1010 the code 136 and then verifies 1012 the code 136. If the code 136 is verified 1012, the next step is to continue 1018. If the code 136 is not verified 1012, then the server 108 evaluates 1020 whether to retry. If the server 108 retries 1020, then a new authentication code 134 is generated 1006. If the server 108 does not retry 1020, then the server 108 is done 1022 and cancels the operation, preventing the user 122, 124 from completing the operation that the user 122, 124 attempted. The server 108 may decide to not retry 1022 if a specified number of unsuccessful attempts have been made to retry the authentication process.

Brick-and-Mortar Transaction Scenario

By way of examples, the following scenarios are offered as further disclosure. A customer 122 patronizes a vendor 124 operating a brick-and-mortar store, such as a department store. The customer 122 locates a deal for an item that the customer 122 wishes to purchase. Accessing the server 108 through the subscription management 300 option, the customer 122 locates the deal 308 and saves it. The customer 122 visits the vendor 124 at the brick-and-mortar location and selects the merchandise 412 to purchase. The customer 122 takes the merchandise to the checkout counter and presents the customer's identification device 102, which is a wallet-sized card containing an identification code 132. The checkout clerk of the vendor 124 inserts the card 102 into a card reader 202, which reads the identification code 132 and routes it through the terminal 106 to the server 108. The server 108 looks up the identification code 132 to verify that it matches a subscribed customer 122 and then sends an authentication code 134 to the remote device 112 registered to the customer 122.

The customer 122 had previously identified to the server 108 a text messaging number for a mobile telephone as the customer's remote device 112. The customer 122 receives the authentication code 134 from the server 108 on the remote device 112 and gives a return code 136 to the clerk for the vendor 124, who types it into the terminal 106. The server 108 checks the return code 136 to authenticate the customer 122, and then authorizes the transaction 404 for the vendor 124.

The server 108 sends the information on the saved deal to the terminal 106, where the purchase price for the transaction 404 is displayed. The server 108 also sends notice to the vendor 124 that the customer 122 has selected a preferred payment account and that the customer prefers only an electronic receipt.

The clerk of the vendor 124 asks the customer 122 whether the customer 122 wishes to pay with the saved preferred payment account, another saved payment account, or with cash, check, or another credit/debit card. The customer 122 tells the vendor 124 to pay for the transaction 404 with the preferred payment account. The vendor 124 completes the transaction 404, gives the merchandise to the customer 122, and thanks the customer 122 for doing business with the vendor 124.

When the customer 122 returns home, the customer 122 accesses the web site for the centralized transaction system 100. The customer 122 enters an identification code 132 onto the web site and the server 108 sends an authorization code 134 to the customer's remote device 112. The customer 122 enters a return code 136 into the web site. The return code 136, in various embodiments, is the same as the authorization code 134 or a combination of the authorization code 134 and a customer code. After evaluating the return code 136, the server 108 authorizes the customer 122 to proceed with interacting with the centralized transaction system 100 on the web site. The customer 122 accesses the set up and maintain account 304 option in subscription management 300 on the web site. There, the customer 122 calls up details on the just completed transaction 404 and completes a web based form to obtain a rebate on the just purchased merchandise. The server 108 notifies the customer 122 that the rebate amount has been credited to the customer's account.

On-Line Transaction Scenario

A customer 122, while surfing on-line, finds an item being sold by a vendor 122 through an on-line store. The customer 122 decides to purchase the item. The customer 122 access the shopping cart of the vendor 122 and provides an identification number 132 by typing it into a field on the web page. The server 108 sends an authorization code 134 to the customer's remote device 112. The customer 122 enters a return code 136 into a field on the web site. After evaluating the return code 136, the server 108 authorizes the customer 122 to proceed with the on-line transaction 404.

The customer 122 is presented with options for paying for the merchandise. The customer 122 chooses the option to pay with the saved preferred payment account. The server 108 debits the preferred payment account and transfers the funds to the vendor 124. A receipt for the transaction 404 is electronically sent to the customer 122.

Convenience Transaction Scenario

A customer 122, while driving, decides to fuel the vehicle. The customer 122 inserts the identification device 102 into the slot in the gas pump, which then sends the identification code 132 to the server 108. The server 108 looks up the identification code 132 and sees that the customer 122 has set a preference for no authentication for this type of convenience transaction. The server 108 authorizes the gas pump to pump fuel for the customer 122. After the fuel is pumped, the server 108 transfers funds sufficient to pay for the transaction 404 from the preferred payment account of the customer 122 to the vendor 124.

Each of the above scenarios describe one embodiment of the centralized transaction system 100. The scenarios are not intended to limit the invention, but are offered only as illustration of how a customer 122 would interact with the system 100.

The centralized transaction system 100 includes various functions. The function of receiving the identification code 132 is implemented, in one embodiment, by the card reader 202 in communication with the server 108. In another embodiment, the function of receiving the identification code 132 is implemented by the customer 122 providing the identification code 132 so that it is input into a terminal 106 or workstation 114 in communication with the server 108.

From the foregoing description, it will be recognized by those skilled in the art that a centralized transaction system 100 has been provided. The system 100 includes a server 108 that communicates with a vendor 124 through a terminal 106 and/or a workstation 114 and with a customer 122 through a workstation 114 and a remote device 102. Both the customer 122 and the vendor 124 subscribe to the system 100 and provide information that is stored on the server 108 to facilitate transactions 404 between the customer 122 and the vendor 124. The vendor 124 offers deals, which the customer 122 can locate and save on the server 108. The customer 122 selects merchandise to purchase from the vendor 124. After the customer 122 is authenticated by the server 108, the transaction 404 is completed and the rebates, if any, are processed 406. The transaction 404 includes authenticating the customer 414, applying the deals 416, and tendering payment 418. After the transaction 404 is completed, both the customer 122 and the vendor 124 access the server 108 to view historical information and reports.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for a centralized transaction system, said apparatus comprising:
   a server programmed to execute a process for managing a customer subscription, said step of managing said customer subscription including creating said customer subscription for a customer by storing a customer data set including a name, a set of contact data, and a set of customer preferences including identification of a customer code to be used as a password, facilitating said customer to maintain said customer subscription, storing a deal located by said customer, storing at least one payment account, storing a preferred payment account, facilitating said customer to access a set of customer historical information;

managing a vendor subscription, said step of managing said vendor subscription including creating said vendor subscription for a vendor by storing a vendor data set including a name and a set of contact data, facilitating said vendor to maintain said vendor subscription, facilitating said vendor to set up and maintain a vendor deal, facilitating said vendor to access a set of vendor historical information;

authenticating said customer for a transaction with said vendor, said step of authenticating including receiving an identification code identifying said customer, said identification code possessed by said customer, sending an authentication code via a communication network attached to said server to said customer whereby said customer receives said authentication code with a remote device that is independent of a transaction device, receiving a return code, wherein said return code is formed by adding the customer code to said authentication code, originating from said customer, verifying that said return code corresponds to said authentication code and said customer code, and authorizing a transaction by said customer;

applying said deal to said transaction with said customer, said step of applying said deal including retrieving a set of data associated with said customer, said set of data including said deal associated with said vendor, applying said deal to said transaction, applying said preferred payment account to pay for said transaction, said step of applying said preferred payment account including retrieving a set of data associated with said customer, said set of data including said preferred payment account, charging a purchase price against said preferred payment account;

facilitating said customer access to a set of customer data associated with said transaction; and facilitating said vendor access to a set of vendor data associated with said transaction.

2. The apparatus of claim 1 wherein said process executed by said server further includes handling a rebate for said transaction, said step of handling including determining if said rebate applies to said transaction, providing information on said rebate to said customer.

3. The apparatus of claim 1 wherein said process step of managing a customer subscription executed by said server further includes verifying said customer identity by matching said name and said set of contact data of said customer with a set of data associated with said at least one payment account.

4. The apparatus of claim 1 wherein said set of customer preferences includes identification of a second vendor associated with a second preferred payment account.

5. The apparatus of claim 1 wherein said set of customer preferences includes identification of a threshold value of said transaction for which said preferred payment account is automatically debited to pay for said transaction.

6. The apparatus of claim 1 wherein said set of customer preferences includes identification of a membership in a patron program for said member.

7. The apparatus of claim 1 wherein said set of customer preferences includes identification of a requirement for at least one of a printed receipt and an electronic receipt from said vendor.

* * * * *